June 30, 1964  J. A. DREYFUS  3,139,545
ELECTRIC MOTOR WITH PERMANENT MAGNET FIELD
AND RECIPROCABLE COIL
Filed March 3, 1959

INVENTORS
Jean Albert Dreyfus
Andreas Musbach
BY
Patent Agent

United States Patent Office 3,139,545
Patented June 30, 1964

3,139,545
ELECTRIC MOTOR WITH PERMANENT MAGNET FIELD AND RECIPROCABLE COIL
Jean Albert Dreyfus, 5 Ave. de la Grenade, Genf, Switzerland, and Andreas Murbach, Bruestrasse 67, Meilen, Switzerland
Filed Mar. 3, 1959, Ser. No. 796,948
Claims priority, application Switzerland Mar. 5, 1958
5 Claims. (Cl. 310—27)

The present invention relates to an electric motor, and, more particularly, to an electric motor of the type having a permanent magnet member and a resilient suspended coil arranged in an air gap of said magnet member.

Electric motors of said dynamoelectric type can be employed for loudspeakers, electromechanical relays, recording oscillographs and the like.

The mobile coil performs a translatory oscillation in the magnetic field of the air gap. This magnetic field is advantageously generated by a permanent magnet of the anisotropic type, i.e. a magnet with arrayed molecules.

It is desirable to provide motors of the mentioned type which are as small as possible and are provided with a large air gap, a strong field and a coil of which the displacements are accurately proportionate to the current passing therethrough, up to large amplitudes and elevated frequencies. In other words, the motor should be small, powerful and linear.

It is therefore, a primary object of the present invention to provide an electric motor of the mentioned type which has improved properties in respect to the linearity of the characteristic.

It is another object of the present invention to provide an electric motor which is small and powerful.

Further it is an object of the present invention to provide an electric motor in which the deflection of the movable coil is independent of the temperature and the atmospheric pressure.

It is further an object of the invention to provide a recording oscillograph incorporating an electric motor having the mentioned advantages.

In known electric motors, e.g. of loudspeakers, it comprises either a central magnet or an outer magnet designed as a ring, or two external bar-type magnets. According to one aspect of the present invention, the motor comprises three magnets, one of which is centrally located and two magnets outside, the latter being designed as either bars or half rings. The direction of magnetization of the central magnet is opposed to that of the two outer magnets. Accordingly, they operate as if they were magnetically arranged in series: a magnet is thereby obtained which is geometrically short but magnetically long, which enables a large air gap, an intensive field and linear operation to be obtained.

Figure 1:
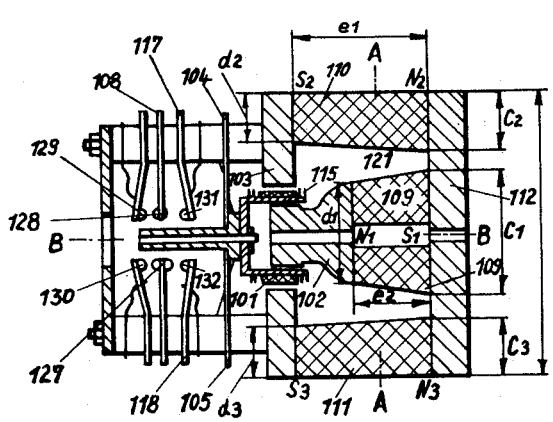
Figure 2:
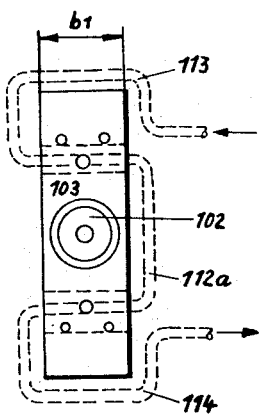
Figure 3:
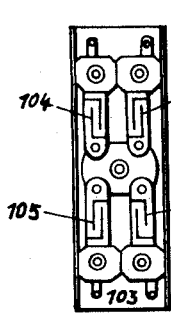
Figure 4:
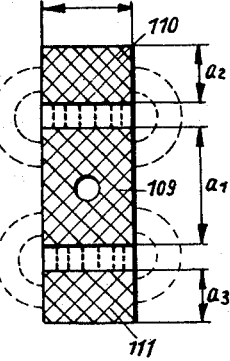
Figure 5:
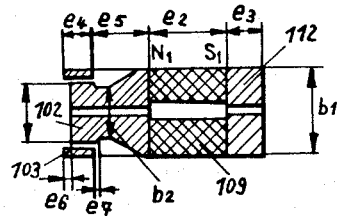
Figures 6, 7, 8, 9, 10:
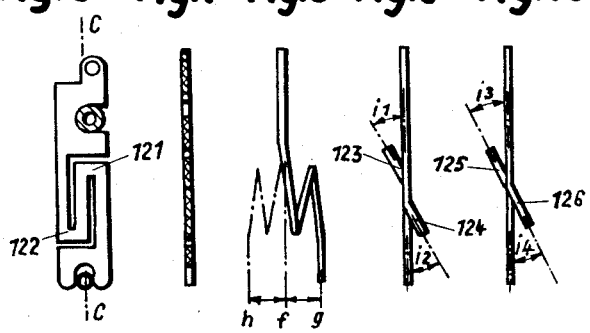

Other objects and features of the present invention will become apparent from the following description, taken in connection with the accompanying drawings, in which:

FIG. 1 is a cross-section of an electromagnetic relay;
FIG. 2 is a view of the magnetic unit of this relay;
FIG. 3 is a view of the relay contacts;
FIG. 4 is a section along line A—A in FIG. 1;
FIG. 5 is a section along line B—B in FIG. 1;
FIG. 6 is an enlarged view of a lamella of the relay according to FIG. 1;
FIG. 7 is a section along line C—C in FIG. 6;
FIG. 8 is a side view of the lamella according to FIG. 6 in operation;
FIGS. 9 and 10 are variants of the lamella according to FIGS. 6 through 8.

According to FIGS. 1 through 5, the mobile coil 101 is suspended in the air gap formed between the pole members 102, 103 by means of the springs 104 through 107 which are provided with angled slits. The magnetic field in the air gap is created by three magnets of which one, 109, is centrally arranged, and two, 110, 111, externally. The direction of magnetization $N_1-S_1$ of the central magnet is opposed to the direction of magnetization, $N_2-S_2$, $N_3-S_3$, of the external magnets. Such magnetization is obtained by inserting, by way of example, three loops 112 through 114 between the three magnets and passing an electric current which will arrange the molecules in the desired direction. The ends of the magnets are connected to a connecting member 112 of ferromagnetic material.

Each cross-section of the central magnet 109 of the height $a_1$ and width $b_1$ is substantially equal to the sum of the two corresponding cross-sections of the outer magnets 110, 111 of which the height is $a_2=a_3=a_1:2$ and the width $b_1$.

The longitudinal section of each magnet has the configuration of a truncated cone, each base having a width of $c_1$ through $c_3$ larger than the corresponding widths $d_1$ through $d_3$ of the opposite ends.

The height $a_1$ of the central magnet 109 is larger than or equal to the width $b_1$. This enables the magnetic leakage to be reduced even if the bases of the three magnets are very close to one another.

The cross-sections of the central magnet are not necessarily rectangular; they may be square, circular, elliptical or otherwise. On the other hand, the cross-sections of the two outer magnets may be lenticular or of semi-circular configuration, a gap between them permitting the passage of the three magnetizing loops.

The magnetic length $e_1$ of the outer magnets is arranged in series with the length $e_2$ of the central magnet. This provides a very great magnetic length for a short unit, which reduces the leakage while enabling the air gap to be increased.

In order to obtain a mobile coil of which the displacements are linear and symmetrical (i.e. proportionate to the current in the two opposite directions), the inner face of the pole core 102 is set back by the distance $e_6$ relative to the face of the outer pole core 103. In addition, the pole member 102 may be provided with a constriction having a diameter $b_2$ of which the shoulder is axially removed from the member 103 by the distance $e_7$.

In order to reduce the thermal error (non-linearity due to the heating of the mobile coil), the coil may be formed of blackened metal same as the surrounding members. On the other hand, it may be provided with annular fins as indicated at 115.

By way of example, FIGS. 1 through 5 may be full-scale representations. The width $b_1$ of the outer magnets may also be increased so as to become equal to the height $a_1$ of the central magnet, the heights $a_2$ and $a_3$ being equal to one half of $a_1$.

Accordingly, the cross-section of the central magnet 109 is a square in which the circular projection of the air gap is symmetrically disposed.

FIGS. 6 through 10 show the suspension lamellae of the coil and mechanical improvements designed to avoid non-linearities.

If the suspension lamellae 104 through 107 were perfectly plane when in repose, they would have the cross-section shown in FIG. 7, which is the section along line C—C in FIG. 6. In operation, and according to FIG. 8, the free end of the lamella passes, from the central position $f$, into the extreme position $g$ or $h$. In the passage through the plane of repose $f$, buckling may be observed if the lamella is somewhat compressed or stressed radially. In order to avoid this tendency, one of the designs according to FIG. 9 or 10 may be selected for the lamella when in repose: the free ends 121, 122 in FIG. 6 may be bent at the angles $i_1$ through $i_4$ relative to the ends 123 through 126 of FIGS. 9 and 10. These angles may be in the range of 10° and 90° depending on the desired reduction of the radial rigidity.

The dynamoelectric motor described in conjunction with FIGS. 1 through 10 may, by way of example, actuate the mobile contacts 127, 128 of a relay relative to the stationary contacts 129 through 132. However, it could also be employed for a different purpose, as in a loudspeaker, a valve, a servo mechanism, a measuring instrument or the like.

The elongated design of the motor according to FIGS. 1 through 5 is particularly advantageous for a relay as it enables two symmetrical pairs of lamellae to be provided which fit its face. The relays can easily be electrically damped owing to its strong magnetic field by means of an external resistance. It may also be employed as a resonant relay without damping, as a chopper, vibrator or the like.

It will be understood that this invention is susceptible to modification in order to adapt it to different usages and conditions; and accordingly, it is desired to comprehend such modifications within this invention as may fall within the scope of the appended claims.

What we claim is:

1. In an electric motor; a bar of magnetic material, three permanent magnets in spaced parallel coplanar relation on said bar, the intermediate one of said magnets being shorter than the other magnets, a soft iron pole piece on the end of said intermediate magnets projecting outwardly therefrom beyond the ends of the two outer magnets, a soft iron member extending between the outer ends of said two outer magnets and having an aperture receiving the end of said pole piece, a coil, and means movably suspending the coil in the gap formed between the periphery of said aperture and said soft iron pole piece, said intermediate magnet being substantially equal in cross sectional area to the sum of the areas of the two outer magnets, and all of said magnets tapering inwardly from the said bar toward the outer ends of said magnets.

2. In an electric motor; a bar of magnetic material, three permanent magnets in spaced parallel coplanar relation on said bar, the intermediate one of said magnets being shorter than the other magnets, a soft iron pole piece on the end of said intermediate magnets projecting outwardly therefrom beyond the ends of the two outer magnets, a soft iron member extending between the outer ends of said two outer magnets and having an aperture receiving the end of said pole piece, a coil, and means movably suspending the coil in the gap formed between the periphery of said aperture and said soft iron pole piece, said intermediate magnet being substantially equal in cross sectional area to the sum of the areas of the two outer magnets, and all of said magnets tapering inwardly from the said bar toward the outer ends of said magnets, said soft iron pole piece also tapering inwardly from the end of said intermediate magnet toward said soft iron member, and the taper of said soft iron pole piece being greater than the taper on said magnets.

3. In an electric motor; a bar of magnetic material, three permanent magnets in spaced parallel coplanar relation on said bar, the intermediate one of said magnets being shorter than the other magnets, a soft iron pole piece on the end of said intermediate magnets projecting outwardly therefrom beyond the ends of the two outer magnets, a soft iron member extending between the outer ends of said two outer magnets and having an aperture receiving the end of said pole piece, a coil, and means movably suspending the coil in the gap formed between the periphery of said aperture and said soft iron pole piece, said intermediate magnet being substantially equal in cross sectional area to the sum of the areas of the two outer magnets, and all of said magnets tapering inwardly from the said bar toward the outer ends of said magnets, said soft iron pole piece also tapering inwardly from the end of said intermediate magnet toward said soft iron member, and the taper of said soft iron pole piece being greater than the taper on said magnets, said permanent magnets being rectangular in cross section and said pole piece being circular in cross section in the region thereof that is disposed within the aperture in said soft iron member.

4. In an electric motor; a bar of magnetic material, three permanent magnets in spaced parallel coplanar relation on said bar, the intermediate one of said magnets being shorter than the other magnets, a soft iron pole piece on the end of said intermediate magnets projecting outwardly therefrom beyond the ends of the two outer magnets, a soft iron member extending between the outer ends of said two outer magnets and having an aperture receiving the end of said pole piece, a coil, and means movably suspending the coil in the gap formed between the periphery of said aperture and said soft iron pole piece, said intermediate magnet being substantially equal in cross sectional area to the sum of the areas of the two outer magnets, and all of said magnets tapering inwardly from the said bar toward the outer ends of said magnets, the said magnets being respectively reversed with regard to the polarity thereof, and being spaced apart a sufficient distance to permit wire means to be introduced therebetween for magnetizing the said magnets in situ.

5. In an electric motor; a bar of magnetic material, three permanent magnets in spaced parallel coplanar relation on said bar, the intermediate one of said magnets being shorter than the other magnets, a soft iron pole piece on the end of said intermediate magnets projecting outwardly therefrom beyond the ends of the two outer magnets, a soft iron member extending between the outer ends of said two outer magnets and having an aperture receiving the end of said pole piece, a coil, and means movably suspending the coil in the gap formed between the periphery of said aperture and said soft iron pole piece, said intermediate magnet being substantially equal in cross sectional area to the sum of the areas of the two outer magnets, and all of said magnets tapering inwardly from the said bar toward the outer ends of said magnets, the said means movably suspending the coil in the said gap comprising slit leaf springs attached at one end to the coil and having their other ends fixed relative to said soft iron member.

References Cited in the file of this patent

UNITED STATES PATENTS

| | | |
|---|---|---|
| 839,713 | Bijur | Dec. 25, 1906 |
| 2,118,862 | Rayment et al. | May 31, 1938 |
| 2,346,555 | Cobb | Apr. 11, 1944 |
| 2,788,511 | Marshall | Apr. 9, 1957 |
| 2,832,903 | Carter | Apr. 29, 1958 |
| 2,842,421 | Dreyfus | July 8, 1958 |
| 2,842,688 | Martin | July 8, 1958 |
| 2,870,350 | Olson | Jan. 20, 1959 |
| 2,943,384 | Wisner | July 5, 1960 |
| 3,009,084 | Balliett | Nov. 14, 1961 |